United States Patent
Yaqub et al.

(10) Patent No.: US 10,527,709 B2
(45) Date of Patent: Jan. 7, 2020

(54) SYSTEM AND METHOD OF DETECTING INDIVIDUALS IN A TARGET GEOGRAPHIC LOCATION WITH A DISASTROUS SITE USING SMART ANTENNA BORNE DRONE

(71) Applicants: Raziq Yaqub, Stewartsville, NJ (US);
Kaveh Heidary, Huntsville, AL (US)

(72) Inventors: Raziq Yaqub, Stewartsville, NJ (US);
Kaveh Heidary, Huntsville, AL (US)

( * ) Notice: Subject to any disclaimer, the term of this patent is extended or adjusted under 35 U.S.C. 154(b) by 5 days.

(21) Appl. No.: 15/615,599

(22) Filed: Jun. 6, 2017

(65) Prior Publication Data
US 2017/0350959 A1 Dec. 7, 2017

Related U.S. Application Data

(60) Provisional application No. 62/345,908, filed on Jun. 6, 2016.

(51) Int. Cl.
| | |
|---|---|
| *G01S 5/02* | (2010.01) |
| *H04W 88/08* | (2009.01) |
| *G01S 5/00* | (2006.01) |
| *G01S 5/06* | (2006.01) |
| *B64C 39/02* | (2006.01) |
| *G01S 3/40* | (2006.01) |

(Continued)

(52) U.S. Cl.
CPC .......... *G01S 5/0289* (2013.01); *B64C 39/024* (2013.01); *G01S 3/40* (2013.01); *G01S 3/42* (2013.01); *G01S 5/0072* (2013.01); *G01S 5/0252* (2013.01); *G01S 5/06* (2013.01); *G01S 5/12* (2013.01); *H04W 88/08* (2013.01); *B64C 2201/12* (2013.01); *B64C 2201/127* (2013.01); *G01S 5/0215* (2013.01)

(58) Field of Classification Search
CPC ... H04M 3/2281; H04W 8/005; H04W 12/08; H04W 8/22; H04W 48/02
USPC ........................................................ 455/411
See application file for complete search history.

(56) References Cited

U.S. PATENT DOCUMENTS

| | | | | |
|---|---|---|---|---|
| 2011/0130636 | A1* | 6/2011 | Daniel | G08B 25/016 600/301 |
| 2012/0026042 | A1* | 2/2012 | Gooch | G01S 3/023 342/442 |

(Continued)

*Primary Examiner* — Charles N Appiah
*Assistant Examiner* — Nicole M Louis-Fils
(74) *Attorney, Agent, or Firm* — The Keys Law Firm PLLC

(57) ABSTRACT

A system and method for detecting individuals in a target geographic location, such as a disastrous site, that identifies and locates potential victims using signals from the victims' cell phone utilizes an unmanned aerial vehicle controlled equipped with a retractable antenna component and a core network connection component. The retractable antenna component includes a mobile telephony base station and employs a smart antenna system so as to estimate the direction of arrival of all incoming signals. The core network connection component is operative to establish a wireless communication link with an Internet Protocol based core network of. When a victim's cell phones attempts to connect to the base station in order to access the core network, the location of the cell phone can be determined. The locations can be plotted on a map and based on the distribution of phones on the map, rescue efforts can be optimized.

8 Claims, 3 Drawing Sheets

FIG. 1A

(51) Int. Cl.
    *G01S 3/42*    (2006.01)
    *G01S 5/12*    (2006.01)

(56) References Cited

U.S. PATENT DOCUMENTS

2013/0285855 A1* 10/2013 Dupray .................. G01S 19/48
                                                    342/451
2015/0304818 A1* 10/2015 Carlsson ............. H04W 64/003
                                                    455/456.1

* cited by examiner

SYSTEM AND METHOD OF DETECTING INDIVIDUALS IN A TARGET GEOGRAPHIC LOCATION WITH A DISASTROUS SITE USING SMART ANTENNA BORNE DRONE

CROSS REFERENCE TO RELATED APPLICATIONS

This application claims the benefit of and incorporates by reference co-pending U.S. provisional patent application Ser. No. 62/345,908 filed Jun. 6, 2016.

BACKGROUND OF THE INVENTION

Field of the Invention

This invention relates to a system and method for detecting and locating human beings in an affected area using a locally generated radio access network.

Description of the Prior Art

In many cases, it is not known when a calamity may hit due to terrorism or a natural catastrophe such as an earthquake, tornado, hurricanes, and so forth. Nonetheless, because such a calamity may collapse buildings, schools, and houses over a vast area, leaving people buried alive under rubble, time is of essence whenever such a calamity hits. Simply put, the faster the first respondents can find the people trapped beneath the multiple masses of debris and wreckage of collapsed buildings, the higher the probability of being rescued.

Still, finding the people that are buried alive under rubble and debris may present a significant challenge, particularly if the destruction from the calamity has rendered all or a significant portion of the existing communication infrastructure in an affected area non-functional.

Attempts have been made to address the issue of locating people in the wake of a calamity. The National Aeronautics and Space Administration has proposed a technology called "Finding Individuals for Disaster and Emergency Response" ("FINDER"). FINDER is based on the radar technology that sends a low-powered microwave signal through the rubble, and looks for the very tiny reflections caused by the motions of the victims breathing and heartbeat. First responders can rapidly look at a series of buildings and determine if there are victims so that they can rescue them in time. There are, however, several shortcomings of FINDER, as: (a) microwaves may be harmful for struggling human bodies; (b) it may not provide consistently accurate results as it not fully automated and involves rescuers judgment in evaluating the reflections coming back from the human bodies; (c) wreckage may be made up of twisted and shattered materials causing the radar signals bounce back and making signals complex such that isolating the relatively weak signal of a heartbeat within the noisy signals becomes a difficult task; and (d) it may not sufficiently distinguish between the reflections from humans vs. animals. Though saving animals is also important, but saving human life is priority.

Other approaches have sought to utilize cellular (or "cell") phone signals in order to locate people for various purposes. For example, the United States military employs a technology for cell phone locating called Stingray. Less expensive and lighter weight versions of the system have also been developed, such as one called the Wolfhound. Stingray or Wolfhound technologies typically are deployed through the use of unmanned aerial vehicles ("UAV"), whose use in modern times for various applications, including military, commercial, scientific, recreational, agricultural, and surveillance, is well established. UAVs are typically deployed along with a ground-based controller and a system of communications between the two as a part of an unmanned aircraft system ("UAS"). To attempt to locate persons through cell phone signals, a UAV may carry one, two, or three antenna systems similar to Stingray, or one of its less complex counterparts such as Wolfhound, and locate cell phones by multilateration. Alternatively, three UAVs, each equipped with one Wolfhound like device, can accomplish the same.

The Stingray system, however, is expensive and may not be accessible to first responders. Also, as both StingRay and Wolfhound may operate only when the cellular communication infrastructure (i.e. cell towers) is functional, a problem which exists is that if the cellular communication infrastructure in an area affected by a calamity is substantially or wholly inoperative, there is presently no locating system which can locate people by their cellular phones to in order to avoid the shortcomings of a system like FINDER. Thus, there remains a need for a system which can perform cell phone locating even when the cellular communication infrastructure is partially or wholly non-functional in the aftermath of a calamity.

Accordingly, what is needed is a system and method which employs a UAV to both deploy a radio access network in an affected area and detect and track individuals in the affected area using signals from cell phones in the affected area that are coming to the deployed radio access network. It would be additionally be desirable for such a system and method to aggregate information related to the detected cell phones in order to enable prioritization of rescue and related operations.

The Applicant's invention described herein provides for a system and method for finding out the victims' precise location, under the debris of wrecked infrastructures. The proposed approach employs an airborne eNodeB and smart antenna system which is hovering over the affected area. The airborne eNodeB and smart antenna system with the accompanying software resolves several issues the first responders face today in the rescue operation. More specifically, the system (a) pinpoints the victims' precise location to the first respondents as well as any robots that would assist in rescue operation (b) virtually classifies the disaster area into regions based on victims density, (c) provides the command center the real time data about the victims successfully rescued, and (d) provides a wireless communication means to the first respondents.

In this way, the system and method described herein is based on extracting and reusing the expedient information that smart antennas have about the number of cell phones, and their location, providing an approach that is much more efficient, accurate and safe for the struggling human bodies under the debris of collapsed buildings. As a result, many of the limitations imposed by prior art systems are removed.

SUMMARY OF THE INVENTION

The present disclosure describes a system and method for detecting individuals in a target geographic location, such as a disastrous site, that identifies and locates potential victims using signals from the victims' cell phone. The system and method for detecting individuals in a target geographic location includes an unmanned aerial vehicle controlled from a command center and equipped with a retractable antenna component, a core network connection component, and an internal controller. The retractable antenna component includes a mobile telephony base station and employs a smart antenna system so as to estimate the direction of arrival of all incoming signals. The core network connection component is operative to establish a wireless communication link through either satellite or microwave communication technologies with an Internet Protocol based core network of a 4G/5G or any state of the future communication system. In this regard, when a victim's cell phones attempts to connect to the base station in order to access the core network, or vice versa, the location of the cell phone can be determined.

Once the location of cell phones in an affected area is determined, the locations can be plotted on a map and based on the distribution of phones on the map, rescue efforts can be optimized.

It is an object of this invention to provide a system and method which employs a UAV to both deploy a radio access network in an affected area and detect and track individuals in the affected area using signals from cell phones in the affected area that are coming to the deployed radio access network.

It is another object of this invention to provide a system and method which can aggregate information related to the detected cell phones in order to enable prioritization of rescue and related operations.

These and other objects will be apparent to one of skill in the art.

DETAILED DESCRIPTION OF THE INVENTION

Figure 1:
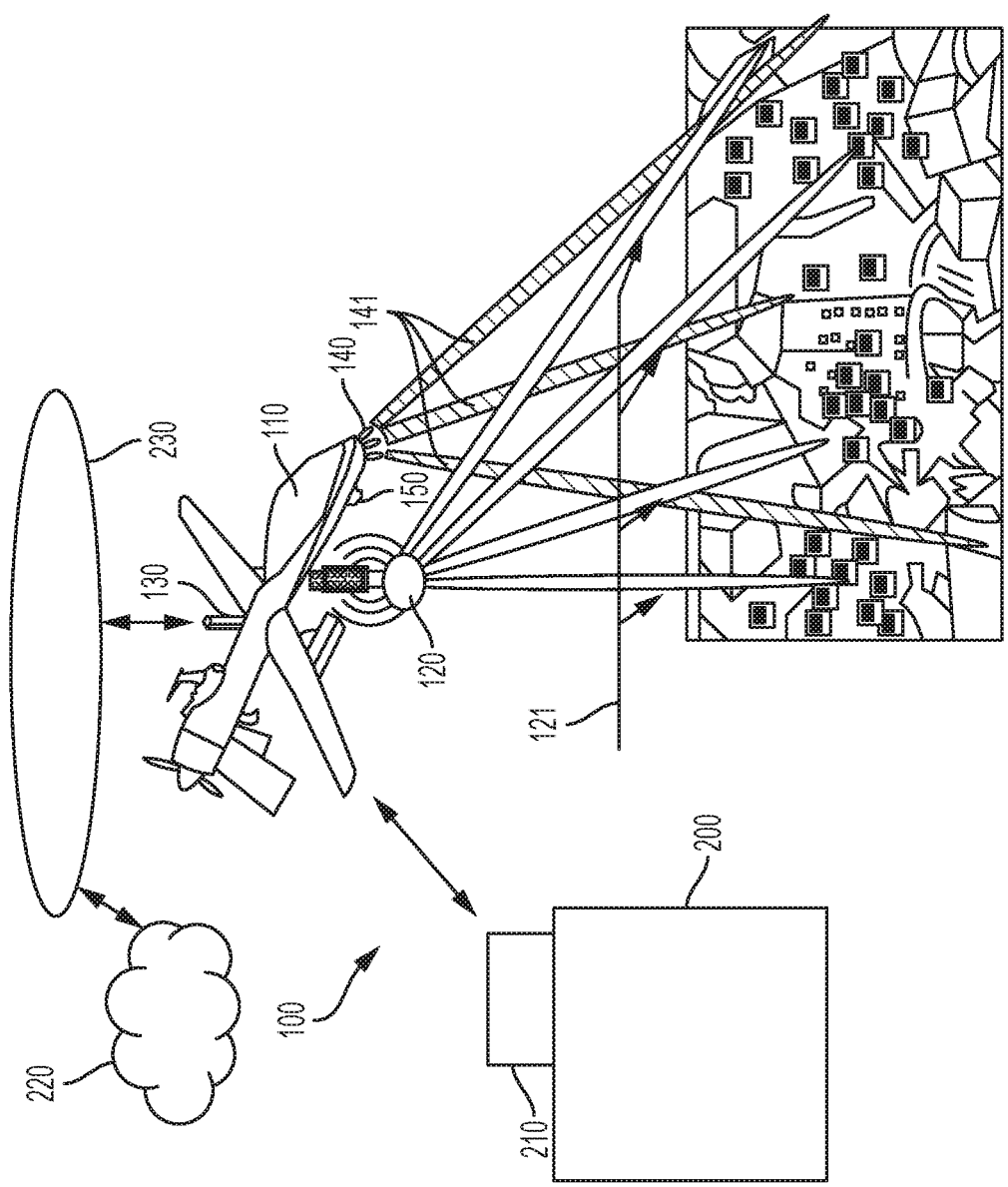
FIG. 1 shows the components of a system for detecting individuals in a target geographic location in accordance with the present invention.
Figure 1A:
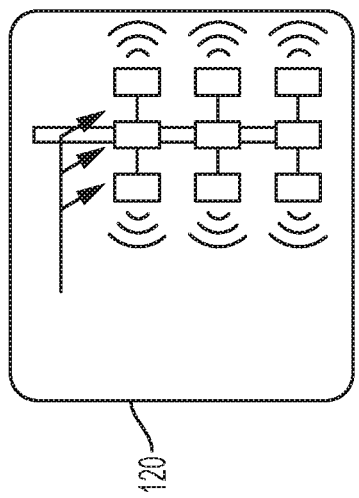
FIG. 1A shows the components of a retractable antenna component for a system for detecting individuals in a target geographic location in accordance with the present invention.

Referring now to the drawings and in particular FIGS. 1 and 1A, a system for detecting individuals in a target geographic location which may embody a disastrous site 100 includes an unmanned aerial vehicle ("UAV" or "drone") 110 built in accordance with the present invention and which is controlled from a command center 200. The UAV 110 built in accordance with the present invention is equipped with a retractable antenna component 120, a core network connection component 130, and an internal controller. It is contemplated that the internal controller integrates the retractable antenna component 120 and core network connection component 130 with the existing power supply of the UAV 110 and integrates the communication and control signaling of the retractable antenna component 120 and core network connection component 130 with the existing communication and control systems of the UAV 110. In this regard, the retractable antenna component 120 and core network connection component 130 may receive electrical power from the UAV's 110 on board power supply. Furthermore, communication with and control of the retractable antenna component 120 and core network connection component 130 may be implemented through the existing system of communications between the UAV 110 and a ground based controller 210 for the UAV 110 that may be present in the command center 200 (or otherwise located outside of the UAV 110).

In some embodiments, the UAV 110 additionally includes a plurality of laser diode elements 140 which emit laser lights 141 to allow for directional illumination for selective targeting of objects and or cells, as described below.

In some embodiments, the UAV 110 additionally includes a camera 150 to allow for capturing images and/or video of desired areas.

The core network connection component 130 is operative to enable the UAV 110 to establish a wireless connection with a core network 220 of a conventional cellular network system. In one embodiment, the core network connection component 130 establishes a wireless communication link 230 through either satellite or microwave communication technologies with an Internet Protocol ("IP") based core network of a 4G/5G communication system.

The retractable antenna component 120 includes a mobile telephony base station suitable to communicate directly wirelessly with mobile handsets and a smart antenna system. In one embodiment, the base station defines an E-UTRAN Node B (or "eNodeB") in 4G/5G mobile system.

The smart antenna system is a part of the eNodeB and operates to estimate the Direction of Arrival ("DoA") of all incoming signals (including multipath and interfering signals) using DoA algorithms and identify the desired user signal(s) and separates it from the rest of the unwanted incoming signals. Once the desired signal(s) are identified, the smart antenna system steers a beam in the direction of the desired signal to track the user as he moves, while placing nulls at interfering signal directions by constantly updating the complex weights. While it is believed that the core operations of smart antenna systems are generally understood, key concepts relied on herein are discussed below to ensure clarity.

The smart antenna system consists of adaptive array antennas (a set of radiating elements arranged in the form of an array), and smart signal processing algorithms to identify the DoA of the signal. The system uses this, and some additional information (as described below), to calculate beam forming vectors to track and locate the antenna beam on the cell-phone units. Since continuous steering of a beam 121 is required as the cell phone moves, high interaction between the cell phone unit and base station is required.

The smart antenna system estimates the DoA of the signal using techniques such as Multiple Signal Classification ("MUSIC"), Estimation of Signal Parameters via Rotational Invariance Techniques ("ESPRIT"), Matrix Pencil (MP), or one of their derivatives. These techniques involve finding of a spatial spectrum and calculating the DoA from the peaks of this spectrum. These calculations are computationally intensive. MP is considered efficient in case of real time systems and under the correlated sources.

Beamforming is the method used to create the radiation pattern of the antenna array by constructively adding the phases (weights) of the signals in the direction of the desired targets/cell phones, and nullifying the pattern of the targets/cell phones which are undesired/interfering targets. In one embodiment, this is done with a simple digital Finite Impulse Response Tapped Delay Line Filters. The weights of these filters may also be changed adaptively to provide optimal beam forming. For adaptive beamforming, high-performance Digital Signal Processing, Embedded Processors, Logic Elements, and typical algorithms (Steepest Descent, and Least Mean Square) are used.

Down Conversion: The signal from each receive antenna is first down converted to baseband, processed by the matched filter multipath estimator, and accordingly assigned to different rake fingers. The beamforming unit on each rake finger then calculates the corresponding beam former weights and channel estimates, using the pilot symbols that have been transmitted through the Dedicated Physical Data Channel ("DPDCH"). Any fast convergence algorithm, such as QRD-RLS (QR Decomposition-based Recursive Least squares) may be used as the weight update algorithm. The updated beamformer weights are then used for multiplication with the data that has been transmitted through the DPDCH. Maximal Ratio Combining (MRC) of the signals from all fingers is then performed to yield the final soft estimate of the DPDCH data The main assumption made herein is that each victim in an affected area either carries a mobile device in his pocket, or close proximity (e.g. bag, purse, etc.). Nowadays and moving in the future, such an assumption is believed to only become more and more of a reality. As the existing communication infrastructure in an affected area is normally wrecked and becomes dysfunctional, it is appreciated that the retractable antenna component 120, furnished in an airborne drone hovering at the affected area for the time the search operation is being carried out, leverages this reality to estimate the specific location of cell phones and thus the victims bearing cell phone.

Figure 2A:
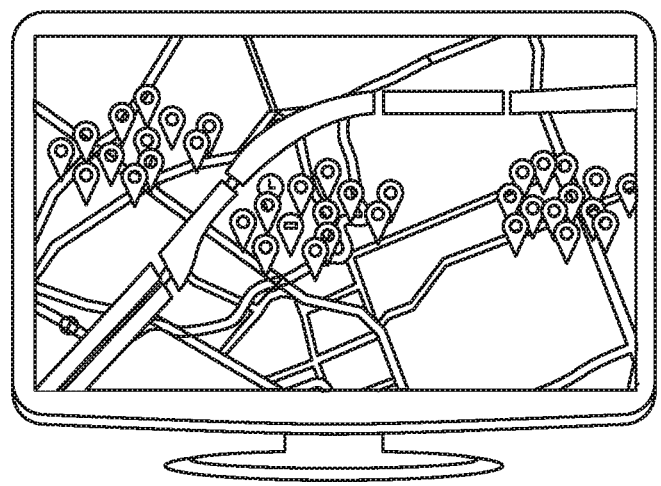
FIG. 2A shows an exemplary map of detected individuals in a system for detecting individuals in a target geographic location in accordance with the present invention.
Figure 2:
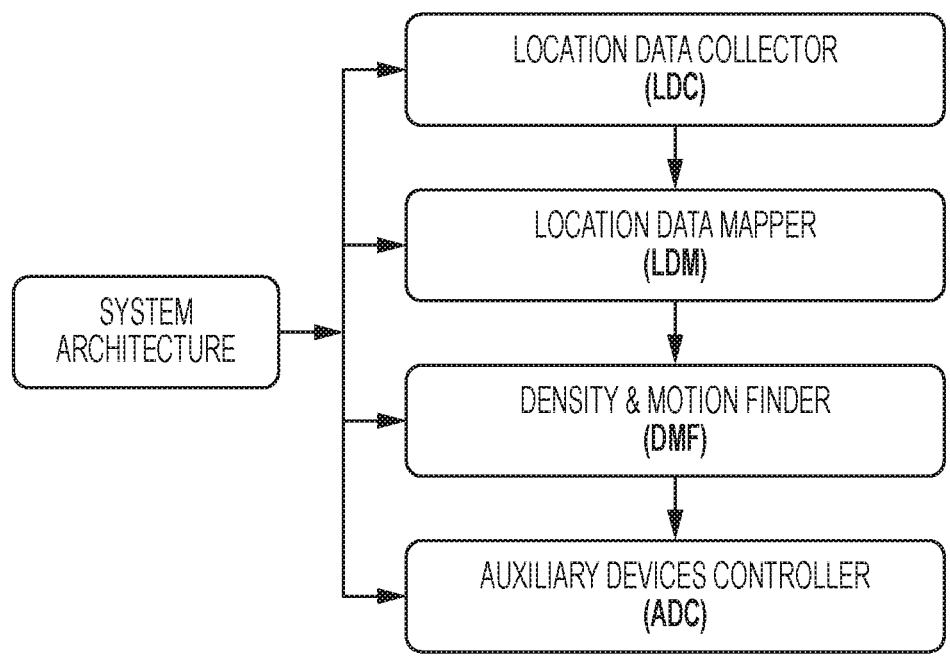
FIG. 2 shows the system architecture for a system for detecting individuals in a target geographic location in accordance with the present invention.

Referring now to FIGS. 2 and 2A, the system for detecting individuals in disastrous sites 100 relies on the performance of several interrelated functions based on information that is extracted from signals from cell phones in an affected area. A Location Data Collector ("LDC" or "Victims Statistics Collector") operates on the internal controller of the drone to extract location/DoA information from the smart antennas coming from the mobile devices to the eNodeB in the uplink direction, convert it in latitude/longitude format, and pass it on to a Location Data Mapper ("LDM").

The LDM operates as a victims' location tracer and may be implemented on a dedicated server, the internal controller of the drone, or both. The LDM generates a spatial projection of the mobile devices which have been detected by the LDC and contains conventional map software, such as Google® Maps. All the mobile devices that happen to exist in the footprint of that Drone eNodeB will be plotted as location marker by the LDM as shown in the FIG. 2A. In this regard, the LDM may use the latitude/longitude information to associate the victims' locations with a Global Positioning System reference point and thereby plot the cell phone positions on a street map or satellite map (or other map, or even building plans) of the affected area. The LDM is able to plot the location very accurately as it takes advantage of the large amount of research that has been targeted towards precision position and accuracy of DoA, and currently several algorithms are commercially deployed that offer the high level, commercial grade precision demanded by the smart antennas.

As stated above, this mapping function may be performed on the drone, or command center, or both. If located on the drone, it is limited to software running on the internal controller/microprocessor (for drone weight consideration). If in command center, it may be a computer which includes visual display. An additional LDM can be optionally installed at a Disaster Relief Center as well.

A Victims' Density and Motion Finder ("DMF") performs several functions, such as: (1) detecting cell phones that are stationary, by comparing their current and past location in a given time frame; (2) determining the number of impacted people (assuming stationary cell phones are possessed by the impacted people; (3) determining the total impacted area by mapping the all the phones with latitude and longitude; (4) dividing the impacted area into virtual cells (e.g. 25×25 meter), mapping the phones with latitude/longitude within the cells, and compute the number of impacted people (or stationary mobiles) per unit cell to find the density; (5) refreshing results and keeping a log to allow for comparisons of the fresh data in each iteration with the previous data and estimations on the status for first respondents' progress.

In addition, with the density value for detected cell phones in various cells, the DMF compares it with a pre-determined threshold value. In one embodiment, the threshold value (or range) is indicative of what is considered to be a medium density of victims in an area. Using this threshold value, the DMF can classify cells as high density victim area, low density victim area, or medium density victim area. This classification information is then passed to the Auxiliary Devices Controller ("ADC").

The ADC receives mapping information from LDM and cell and classification information from the DMF and uses it to beams red laser light towards high density areas, yellow to the medium, and green to the low density areas. In this regard, it allows for the operation of the first respondents to be systematized and provides color coded guides to high priority areas. It may also be used to guide any rescue robots that can be used to lift the heavy debris.

It is contemplated that the DMF may also provide statistics on the number of impacted people per unit cell or total to an emergency response center and/or local hospitals.

Figure 3:
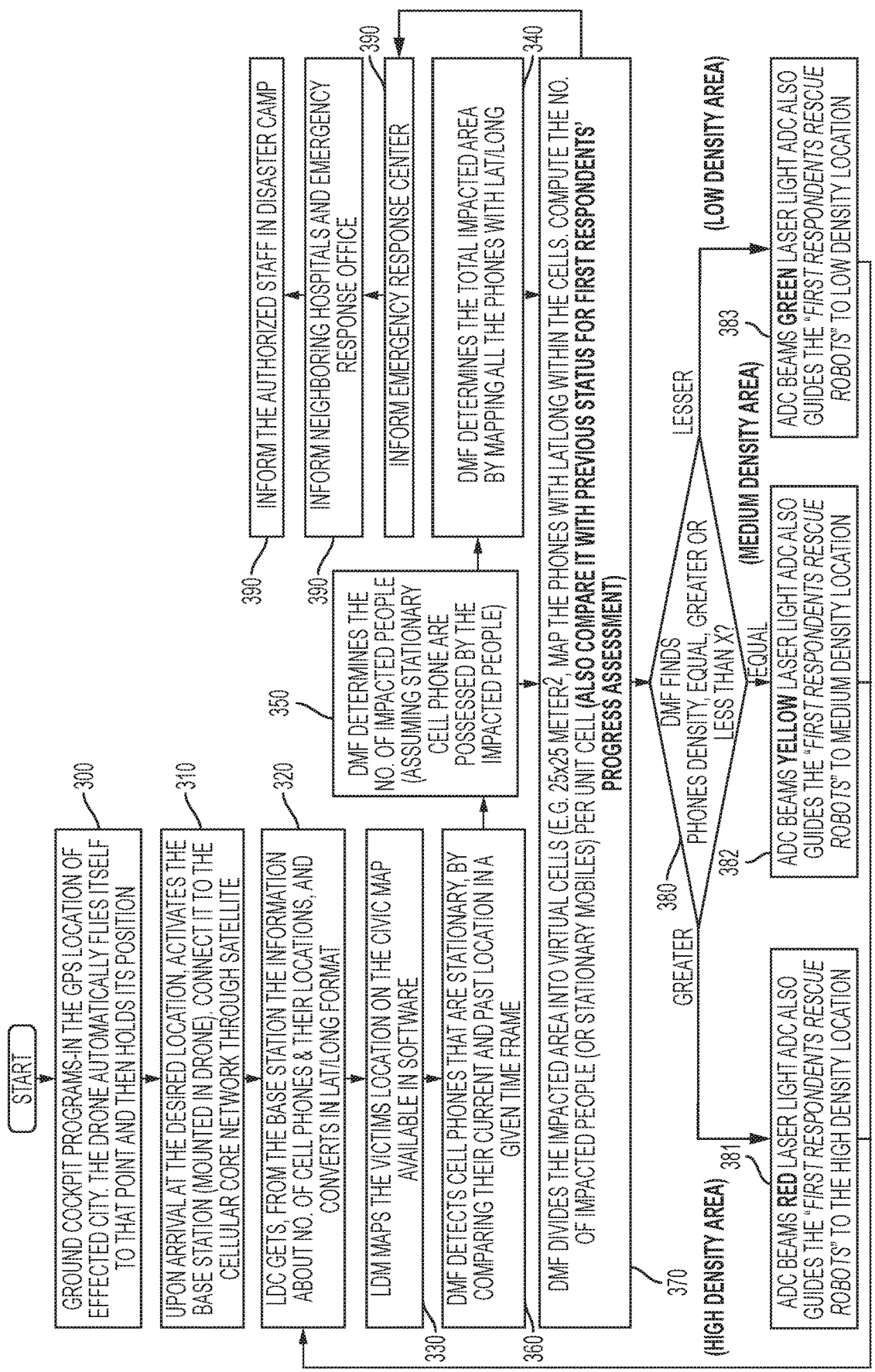
FIG. 3 shows a process for detecting individuals in a target geographic location in accordance with the present invention.

Referring now to FIG. 3, the process through which individuals in disastrous sites may be detected by their cell phone signals begins with a ground cockpit, operating as the ground based controller of a UAV built in accordance with the present invention, directing the UAV to specified location 300, which may be a city or other location in the aftermath of a calamity (i.e., an affected area). From such direction, the UAV flies to the affected area and holds it position.

Upon arriving at the specified location, the UAV deploys its retractable antenna component and activates the base station as well as activates its core network connection component to establish a cellular core network connection 310. Once the base station is activated and mobile devices in range begin to communicate with it, the LDC retrieves information gathered by the smart antenna system that is integrated with the base station to identify the number of cell phones in the area covered by the base station's signal as well as the locations of the cell phones 320. The LDC then calculates the longitude and latitude coordinates for each identified cell phone 320 and passes this information to the LDM, thereby allowing the LDM to plot the location of each identified cell phone on a map 330.

With all identified cell phones plotted on a map, the DMF determines the total impact area 340 and the number of impacted people 350 from the mapping of each identified cell phone, with the number of impacted people being determined based on an identification of which identified cell phones are stationary over a period of time 360. The DMF also divides the total impacted area into virtual cells, overlays the cells on the map with the plotted identified cell phones, and calculates the number of impacted people in each virtual cell 370. Each virtual cell is then classified by the DMF as a high density, medium density and low density cells 380.

Once the virtual cells are classified, the ADC causes the UAV to beam a red laser light to high density locations 381, a yellow laser light to medium density locations 382, and a green laser light to low density locations 383. The ADC may also send electrical signals to electronic rescue devices, including robots, to identify the various locations and guide them to desired locations.

It is contemplated that once the number of impacted people has been determined, the DMF may also inform emergency response personnel and medical providers of the number of impacted people and other information related to the calamity 390.

In an alternate embodiment, the system disclosed herein can also be applied for detecting a cell phone operated Improvised Explosive Device ("IED"). An IED is a destructive device capable of causing massive damage and loss of life. It is normally concealed on the deserted roadside, along with a cell phone that on receipt of a message from a remote cell phone (operated by a criminal, terrorist, or insurgent), detonates the IED.

The solution offered by the system disclosed herein is to identify the cell phone that is coupled and concealed with an IED on the roadside and is stationary. The objective is achieved by exploiting DoA and timing advance information transmitted from cell phone to smart antennas installed on cellular base stations. The malignant phone can be filtered out from the rest of benign phones, if any, on that path based on the non-mobility for extended amount of time.

Two scenarios may be considered, namely detecting cell phone coupled IEDs in a foreign land and detecting cell phone coupled IEDs in the homeland. For the former, where the conventional cellular communication infrastructure is in the jurisdiction of foreign operator, flying cell towers (i.e. drone-borne, small form factor, light weight and low power, smart antennas) may be deployed. A system similar to that described above that comprises of a hovering smart antennas array, connected to the cellular packet core of the home network through satellite backhaul communication link, and a downlink communication link between the drone and the portable location tracer equipped with map software and IED alert alarm, carried by a convoy. The portable location tracer, upon detection of suspicious mobile phone (potentially coupled with IED) will provide visual and audible alarm and also pinpoint the precise location(s) of the cell phone to warn the convoy and save them from damage or loss of life. This is done by leveraging the direction finding capability of smart antennas and the stand-by signals originating from the cell phones. The underlying assumption is that there exists a roaming agreement between the cellular operators of the two countries.

For the latter, inland mobile wireless service providers' terrestrial infrastructure who have deployed smart antennas technology may be used. In remote areas where there is a lack of adequate cellular infrastructure, however, the drone born smart antennas as discussed above may be employed.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for detecting individuals in a target geographic location which may embody a disastrous site, comprising the steps of:
   causing an unmanned aerial vehicle to be directed to a selected geolocation at the target geographic location, wherein said unmanned aerial vehicle is equipped with an antenna component adapted to communicate directly wirelessly with mobile handsets through an included mobile telephony base station system and estimate the Direction of Arrival of all incoming wireless signals as well as identify and separate desired incoming wireless signals through a smart antenna system;
   wherein said unmanned aerial vehicle is additionally equipped with a core network connection component adapted to establish a wireless communication link with an Internet Protocol based core network;
   connecting by said core network connection component to the Internet Protocol based core network;
   activating by said antenna component the base station system, thereby enabling a plurality of mobile handsets in the target geographic location to communicate wirelessly with the antenna component;
   determining the location by geographic coordinates of each of the plurality of mobile handsets based on wireless communications between the each of the plurality of mobile handsets and the antenna component;
   plotting each of the plurality of mobile handsets on a map;
   determining a total impact area based on the geographic coordinates of each of the plurality of mobile handsets;
   determining whether each of the plurality of mobile handsets in the target geographic location is stationary;
   partitioning the total impact area into a plurality of virtual sections; and
   assigning a priority level to each of the plurality of virtual sections.

2. The method of claim 1, additionally comprising the step of tabulating, for each virtual section, a section density which is based on the quantity of the plurality of mobile handsets determined to be stationary in each virtual section.

3. The method of claim 2, additionally comprising the step of indicating the priority level for each of the plurality of virtual sections, wherein the priority level for each of the plurality of virtual sections is based on the tabulated section density values relative to a predetermined threshold value.

4. The method of claim 3, wherein for each of the plurality of virtual sections, the step of indicating includes directing a visual indicator from the unmanned aerial vehicle to a geographic location which corresponds to the respective virtual section.

5. The method of claim 1, wherein the step of determining the location is performed using the Direction of Arrival of incoming signals from the first mobile handset to the antenna component.

6. The method of claim 1, wherein the plurality of virtual sections have fixed spatial dimensions.

7. The method of claim 1, additionally comprising the step of tabulating a total quantity which defines the number of the plurality of mobile handsets determined to be stationary.

8. The method of claim 1, additionally comprising the step of overlaying each of the plurality of virtual sections on the map.

* * * * *